United States Patent

Hurst

(10) Patent No.: US 9,510,029 B2
(45) Date of Patent: Nov. 29, 2016

(54) SYSTEMS AND METHODS TO PROVIDE TRICK PLAY DURING STREAMING PLAYBACK

(75) Inventor: Mark B. Hurst, Cedar Hills, UT (US)

(73) Assignee: EchoStar Advanced Technologies L.L.C., Englewood, CO (US)

( * ) Notice: Subject to any disclaimer, the term of this patent is extended or adjusted under 35 U.S.C. 154(b) by 530 days.

(21) Appl. No.: 13/027,220

(22) Filed: Feb. 14, 2011

(65) Prior Publication Data

US 2012/0210216 A1 Aug. 16, 2012

Related U.S. Application Data

(60) Provisional application No. 61/303,579, filed on Feb. 11, 2010.

(51) Int. Cl.
*H04N 7/173* (2011.01)
*H04N 21/2343* (2011.01)
*H04N 21/2387* (2011.01)
*H04N 21/6587* (2011.01)
*H04N 5/783* (2006.01)
*H04N 5/765* (2006.01)

(52) U.S. Cl.
CPC .... *H04N 21/23439* (2013.01); *H04N 21/2387* (2013.01); *H04N 21/6587* (2013.01); *H04N 5/765* (2013.01); *H04N 5/783* (2013.01)

(58) Field of Classification Search
CPC .............. H04N 7/26686; H04N 7/26696; H04N 21/47202; H04N 21/23439; H04N 21/2387; H04N 21/4587
USPC ............... 725/88, 131, 134, 141, 142, 151
See application file for complete search history.

(56) References Cited

U.S. PATENT DOCUMENTS

| | | | |
|---|---|---|---|
| 4,535,355 A | 8/1985 | Arn et al. | |
| 5,168,356 A | 12/1992 | Acampora et al. | |
| 5,768,527 A | 6/1998 | Zhu et al. | |
| 5,953,506 A | 9/1999 | Kalra et al. | |
| 6,118,817 A * | 9/2000 | Wang | 375/240.03 |
| 6,185,736 B1 | 2/2001 | Ueno | |

(Continued)

FOREIGN PATENT DOCUMENTS

| | | |
|---|---|---|
| CA | 2466482 A1 | 5/2003 |
| CN | 1396742 A | 2/2003 |

(Continued)

OTHER PUBLICATIONS

USPTO "International Search Report" mailed Dec. 12, 2008; International Appln. No. PCT/US2008/061035, filed Apr. 21, 2008.

(Continued)

*Primary Examiner* — Farzana Hossain
(74) *Attorney, Agent, or Firm* — LK Global

(57) ABSTRACT

Systems and methods are described for providing trick play functions such as fast forward, rewind or slow motion during playback of streaming media content. Multiple sets of streamlets or other media files that represent the same media stream are encoded differently from each other (e.g., at different frame rates and/or frame directions), and each set of files is simultaneously maintained at a server. Files encoded at a first format are made available to the client device during regular playback, and files encoded at a different frame rate and/or a different direction of encoding are made available to support trick play.

33 Claims, 3 Drawing Sheets

(56) References Cited

U.S. PATENT DOCUMENTS

| | | |
|---|---|---|
| 6,195,680 B1 | 2/2001 | Goldszmidt et al. |
| 6,366,614 B1 | 4/2002 | Pian et al. |
| 6,374,289 B2 | 4/2002 | Delaney et al. |
| 6,490,627 B1 | 12/2002 | Kalra et al. |
| 6,574,591 B1 | 6/2003 | Kleiman et al. |
| 6,604,118 B2 | 8/2003 | Kleiman et al. |
| 6,618,752 B1 | 9/2003 | Moore et al. |
| 6,721,723 B1 | 4/2004 | Gibson et al. |
| 6,732,183 B1 | 5/2004 | Graham |
| 6,760,772 B2 | 7/2004 | Zou et al. |
| 6,795,863 B1 | 9/2004 | Doty, Jr. |
| 6,845,107 B1 | 1/2005 | Kitazawa et al. |
| 6,850,965 B2 | 2/2005 | Allen |
| 6,859,839 B1 | 2/2005 | Zahorjan et al. |
| 6,874,015 B2 | 3/2005 | Kaminsky et al. |
| 6,976,090 B2 | 12/2005 | Ben-Shaul et al. |
| 7,054,774 B2 | 5/2006 | Batterberry et al. |
| 7,054,911 B1 | 5/2006 | Lango et al. |
| 7,093,001 B2 | 8/2006 | Yang et al. |
| 7,099,954 B2 | 8/2006 | Li et al. |
| 7,174,385 B2 | 2/2007 | Li |
| 7,194,549 B1 | 3/2007 | Lee et al. |
| 7,240,100 B1 | 7/2007 | Wein et al. |
| 7,274,740 B2 | 9/2007 | van Beek et al. |
| 7,325,073 B2 | 1/2008 | Shao et al. |
| 7,334,044 B1 | 2/2008 | Allen |
| 7,349,358 B2 | 3/2008 | Hennessey et al. |
| 7,376,747 B2 | 5/2008 | Hartop |
| 7,477,688 B1 | 1/2009 | Zhang et al. |
| 7,523,181 B2 | 4/2009 | Swildens et al. |
| 7,546,355 B2 | 6/2009 | Kalnitsky |
| 7,593,333 B2 | 9/2009 | Li et al. |
| 7,599,307 B2 | 10/2009 | Seckin et al. |
| 7,609,652 B2 | 10/2009 | Kellerer et al. |
| 7,719,985 B2 | 5/2010 | Lee et al. |
| 7,760,801 B2 | 7/2010 | Ghanbari et al. |
| 7,779,135 B2 | 8/2010 | Hudson et al. |
| 7,797,439 B2 | 9/2010 | Cherkasova et al. |
| 7,817,985 B2 | 10/2010 | Moon |
| 7,818,444 B2 | 10/2010 | Brueck et al. |
| 2001/0047423 A1 | 11/2001 | Shao et al. |
| 2002/0091840 A1 | 7/2002 | Pulier et al. |
| 2002/0097750 A1 | 7/2002 | Gunaseelan et al. |
| 2002/0152317 A1 | 10/2002 | Wang et al. |
| 2002/0152318 A1 | 10/2002 | Menon et al. |
| 2002/0169926 A1 | 11/2002 | Pinckney, III et al. |
| 2002/0176418 A1 | 11/2002 | Hunt et al. |
| 2002/0178330 A1 | 11/2002 | Schlowsky-Fischer et al. |
| 2003/0014684 A1 | 1/2003 | Kashyap |
| 2003/0021166 A1 | 1/2003 | Soloff |
| 2003/0140159 A1 | 7/2003 | Campbell et al. |
| 2003/0151753 A1 | 8/2003 | Li et al. |
| 2003/0154239 A1 | 8/2003 | Davis et al. |
| 2004/0030547 A1 | 2/2004 | Leaning et al. |
| 2004/0083283 A1 | 4/2004 | Sundaram et al. |
| 2004/0103444 A1 | 5/2004 | Weinberg et al. |
| 2004/0117427 A1 | 6/2004 | Allen et al. |
| 2004/0168052 A1 | 8/2004 | Clisham et al. |
| 2004/0260701 A1 | 12/2004 | Lehikoinen et al. |
| 2005/0066063 A1 | 3/2005 | Grigorovitch et al. |
| 2005/0076136 A1 | 4/2005 | Cho et al. |
| 2005/0084166 A1 | 4/2005 | Boneh et al. |
| 2005/0108414 A1 | 5/2005 | Taylor et al. |
| 2005/0120107 A1 | 6/2005 | Kagan et al. |
| 2005/0185578 A1 | 8/2005 | Padmanabhan et al. |
| 2005/0188051 A1 | 8/2005 | Sneh |
| 2005/0204046 A1 | 9/2005 | Watanabe |
| 2005/0262257 A1 | 11/2005 | Major et al. |
| 2006/0026654 A1* | 2/2006 | An et al. ............... 725/89 |
| 2006/0059223 A1 | 3/2006 | Klemets et al. |
| 2006/0080718 A1 | 4/2006 | Gray et al. |
| 2006/0165166 A1 | 7/2006 | Chou et al. |
| 2006/0168290 A1 | 7/2006 | Doron |
| 2006/0168295 A1 | 7/2006 | Batterberry et al. |
| 2006/0184688 A1 | 8/2006 | Ganguly et al. |
| 2006/0206246 A1 | 9/2006 | Walker |
| 2007/0030833 A1 | 2/2007 | Pirzada et al. |
| 2007/0031110 A1 | 2/2007 | Rijckaert |
| 2007/0094405 A1 | 4/2007 | Zhang |
| 2007/0169161 A1 | 7/2007 | Kienzle et al. |
| 2007/0186228 A1* | 8/2007 | Ramaswamy et al. ......... 725/14 |
| 2007/0280255 A1 | 12/2007 | Tsang et al. |
| 2008/0037527 A1 | 2/2008 | Chan et al. |
| 2008/0205291 A1 | 8/2008 | Li et al. |
| 2008/0219151 A1 | 9/2008 | Ma et al. |
| 2008/0222235 A1 | 9/2008 | Hurst et al. |
| 2008/0263180 A1 | 10/2008 | Hurst et al. |
| 2008/0281803 A1 | 11/2008 | Gentric |
| 2009/0055471 A1 | 2/2009 | Kozat et al. |
| 2009/0055547 A1 | 2/2009 | Hudson et al. |
| 2009/0210549 A1 | 8/2009 | Hudson et al. |
| 2010/0098103 A1 | 4/2010 | Xiong et al. |
| 2010/0195974 A1* | 8/2010 | Zheng et al. .................. 386/68 |
| 2011/0035507 A1 | 2/2011 | Brueck et al. |
| 2011/0064384 A1* | 3/2011 | Otani ................ G11B 27/005 386/248 |
| 2011/0116772 A1* | 5/2011 | Kwon ............... H04N 21/2353 386/343 |

FOREIGN PATENT DOCUMENTS

| | | |
|---|---|---|
| CN | 1997154 A | 7/2007 |
| CN | 101018323 A | 8/2007 |
| CN | 101075949 A | 11/2007 |
| EP | 0812112 A2 | 12/1997 |
| GB | 2447736 A | 9/2008 |
| JP | 200192752 | 4/2001 |
| JP | 2004054930 | 2/2004 |
| WO | 0033567 | 6/2000 |
| WO | 0167264 A1 | 9/2001 |
| WO | 03003760 A2 | 1/2003 |
| WO | 03009581 A1 | 1/2003 |
| WO | 03027876 A1 | 4/2003 |
| WO | 2004025405 A2 | 3/2004 |
| WO | 2004036824 A1 | 4/2004 |
| WO | 2004102571 A1 | 11/2004 |
| WO | 2006010113 A2 | 1/2006 |
| WO | 2010065757 A1 | 6/2010 |

OTHER PUBLICATIONS

Australian Government "Examiner's First Report" dated Oct. 17, 2011; Australian Patent Appln. No. 2011213730.

Korean Intellectual Property Office "Official Notice of Preliminary Rejection" issued Jul. 28, 2011; Korean Patent Appln. No. 10-2006-7025274.

Japan Patent Office "Notice of Rejection Ground" mailed Apr. 26, 2011; Japanese Patent Appln. No. 2007-511070.

Fujisawa, Hiroshi et al. "Implementation of Efficient Access Mechanism for Multiple Mirror-Servers" IPSJ SIG Technical Report, vol. 2004, No. 9 (2004-DPS-116), Jan. 30, 2004, Information Processing Society of Japan, pp. 37-42.

USPTO "Final Office Action" mailed Feb. 23, 2011; U.S. Appl. No. 12/075,475, filed Mar. 10, 2008.

Zhang, Xinyan et al. "CoolStreaming/DONet: A Data-Driven Overlay Network for Peer-to-Peer Live Media Streaming" IEEE 2005.

USPTO "Examiner's Answer" mailed Feb. 16, 2011; U.S. Appl. No. 11/116,783, filed Apr. 28, 2005.

Major, R. Drew et al. "Reply Brief" filed Apr. 18, 2011; U.S. Appl. No. 11/116,783, filed Apr. 28, 2005.

Liu, Jiangchuan et al. "Adaptive Video Multicast Over the Internet" IEEE Computer Society, 2003.

Rejaie, Reza et al. "Architectural Considerations for Playback of Quality Adaptive Video Over the Internet" University of Southern California, Information Sciences Institute, 1998.

Roy, Sumit et al. "A System Architecture for Managing Mobile Streaming Media Services" Streaming Media Systems Group, Hewlett-Packard Laboratories, 2003.

Xu, Dongyan et al. "On Peer-to-Peer Media Streaming" Department of Computer Sciences, Purdue University, 2002.

(56) References Cited

OTHER PUBLICATIONS

Kozamernik, Franc "Media Streaming Over the Internet—An Over of Delivery Technologies" EBU Technical Review, Oct. 2002.

Lienhart, Rainer et al. "Challenges in Distributed Video Management and Delivery" Intel Corporation, EECS Dept., UC Berkeley, 2000-2002.

European Patent Office, International Searching Authority, "International Search Report" mailed Mar. 30, 2011; International Appln. No. PCT/US2011/024807, filed Feb. 14, 2011.

Canadian Intellectual Property Office, Office Action, dated Jun. 20, 2014 for Canadian Patent Application No. 2,789,448.

European Patent Office, Examination Report, dated May 20, 2014 for European Patent Application No. 11704519.5.

State Intellectual Property Office of the People's Republic of China, Office Action for Chinese Patent Application No. 201180015088.9, mailed Apr. 29, 2015.

Pantos, R. et al., HTTP Live Streaming; draft-pantos-http-live-streaming-02.txt, HTTP Live Streaming, Draft-Pantos-HTTP-Live-Streaming-02.Txt, Internet Engineeriong Task Force, IETF; Standardworkingdraft, Internet Society (ISOC)( 4, Rue Des Falaises CH-1205 Geneva, Switzerland, No. 2, Oct. 5, 2009.

* cited by examiner

SYSTEMS AND METHODS TO PROVIDE TRICK PLAY DURING STREAMING PLAYBACK

PRIORITY CLAIM

This application claims priority of U.S. Provisional Application Ser. No. 61/303,579 entitled "REWIND AND FAST-FORWARD VIEWING EXPERIENCE ON A WEB-BASED STREAMING PLAYBACK PLATFORM", which was filed on Feb. 12, 2010 and is incorporated herein by reference.

TECHNICAL FIELD

The following discussion relates to streaming of media content over a network, and, more specifically, to trick play such as rewinding and fast-forwarding of streaming media content.

BACKGROUND

A wide variety of streaming audio, video and/or other media content is now available to consumers from any number of diverse sources. Often, streaming media content is maintained at a media server that provides the content to the consumer for playback via one or more wired or wireless telecommunications networks. So-called "Internet television", for example, is typically provided as a stream over the Internet or a similar network. Media streams are also used to provide other types of network-based media content, as well as live and pre-recorded broadcast television, content-on-demand and the like.

While streaming formats can be convenient for many applications, implementing "trick play" (such as fast-forward and rewind functions) is often relatively difficult within many conventional streaming environments. To "fast forward" a conventional media stream, for example, some streaming media players simply accumulate and decode future content that has been received but not yet played, and then discard those decoded media frames that are not needed. Conversely, to implement a rewind feature, the media player typically skips backwards in a buffer or cache of previously-received content to replay media frames that were previously decoded. The rewind feature is often limited, however, to previously-received content that is maintained in local storage at the player. If the user wishes to rewind past the content that remains in local storage, then prior content typically needs to be re-obtained from the server and re-decoded to continue the rewind. This can consume substantial amounts of memory, as well as significant processing resources. This relatively inefficient operation is especially troublesome for software decoders and the like that may have limited processing resources.

Further, the non-sequential and irregular nature of many popular media streaming formats can create challenges in identifying the particular media frames that are rendered during most conventional trick play functions. Some fast forward or rewind functions simply skip ahead (or behind) in the stream by locating and presenting certain "key frames" that carry information without dependencies to other frames (e.g., the I-frames of a conventional MPEG stream). These key frames, however, are not typically located at regular intervals or other predictable locations within the media stream. As a result, obtaining the key frames often involves scanning most, if not all, of the stream to locate the key frames, and then discarding the remaining decoded content.

It is therefore desirable to implement an effective trick play feature that is suitable for use in streaming media applications. Ideally, such a feature would reduce or eliminate the need for additional processing resources or special buffering, as well as the need to scan for key frames located at irregular intervals. These and other desirable features will become apparent from the subsequent detailed description and the appended claims, taken in conjunction with the accompanying drawings and this background section.

BRIEF SUMMARY

According to various embodiments, systems and methods are described for providing trick play functions such as fast forward, rewind or slow motion during playback of streaming media content. Multiple sets of streamlets or other media objects that represent the same media stream are encoded at different frame rates, and each set of objects is simultaneously maintained at a network-accessible service such as a media server or content delivery network (CDN). Objects encoded in a first manner are made available to the client device during regular playback, and objects encoded in a different manner (e.g., at a different frame rate and/or frame order) are made available to support trick play. Fast forward or rewind operations, for example, may be supported using streamlets or other files that provide a lower frame rate than the regular playback stream. For rewind functions, the frames may be arranged in reverse order within the media object so that frames occurring later in time during regular playback are arranged first in the rewind stream. Slow motion (in either a forward or a reverse direction) may be supported using streamlets or other objects that have a greater frame rate than the regular playback stream, as desired. Objects having different frame rates and/or reversed frames may be intermixed to support trick play functions as desired.

Various embodiments provide a method executable by a computer, media player and/or another client device to process a media stream received via a network. The method suitably comprises receiving a first portion of the media stream at the client device via the network, wherein the frames of the first portion of the media stream are encoded in a first manner; rendering the first portion of the media stream for playback; receiving a user instruction at the client device that indicates a trick play function; receiving a second portion of the media stream, wherein the frames of the second portion of the media stream are encoded in a different manner than the first portion of the media stream; and rendering at least some of the second portion of the media stream for playback to thereby perform the trick play function.

Other embodiments provide a method executable by a file server, content delivery system or other data processing system to provide a media stream to a client device via a network. The method suitably comprises maintaining a first set of files that collectively represents the media stream, wherein each of the first set of files is encoded at a first frame rate and wherein the first set of files is sequentially ordered according to a time index; simultaneously maintaining a second set of files that collectively represents the same media stream sequentially-ordered according to the same time index as the first set of files, wherein the second set of files is encoded at a second frame rate that is different from the first frame rate; sequentially providing files from the first set of files to the client device via the network during normal playback of the media stream; and providing files from the second set of files to the client device during a trick play operation.

Still other embodiments provide a data processing system that provides a media stream to a client device via a network. The data processing system suitably comprises an interface to the network, a database, and a media server. The database is configured to simultaneously maintain a first set of files and a second set of data files that each collectively represent the same media stream and that are each sequentially ordered according to a common time index. The media server communicates with the database and the interface, and is configured to sequentially provide files from the first set of files to the client device via the network during normal playback of the media stream and, in response to a user of the client device instructing a trick play operation, to provide files from the second set of files to the client device during the trick play operation.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to the various embodiments described herein, apparatus, methods and systems present trick-play media viewing experiences in a streamed content implementation. In accordance with at least one embodiment, a rewind and fast-forward viewing experience on a web-based streaming playback platform is described. Other embodiments may be used to implement broadcast television, video on demand, web television and/or any other applications as desired.

Figure 1:
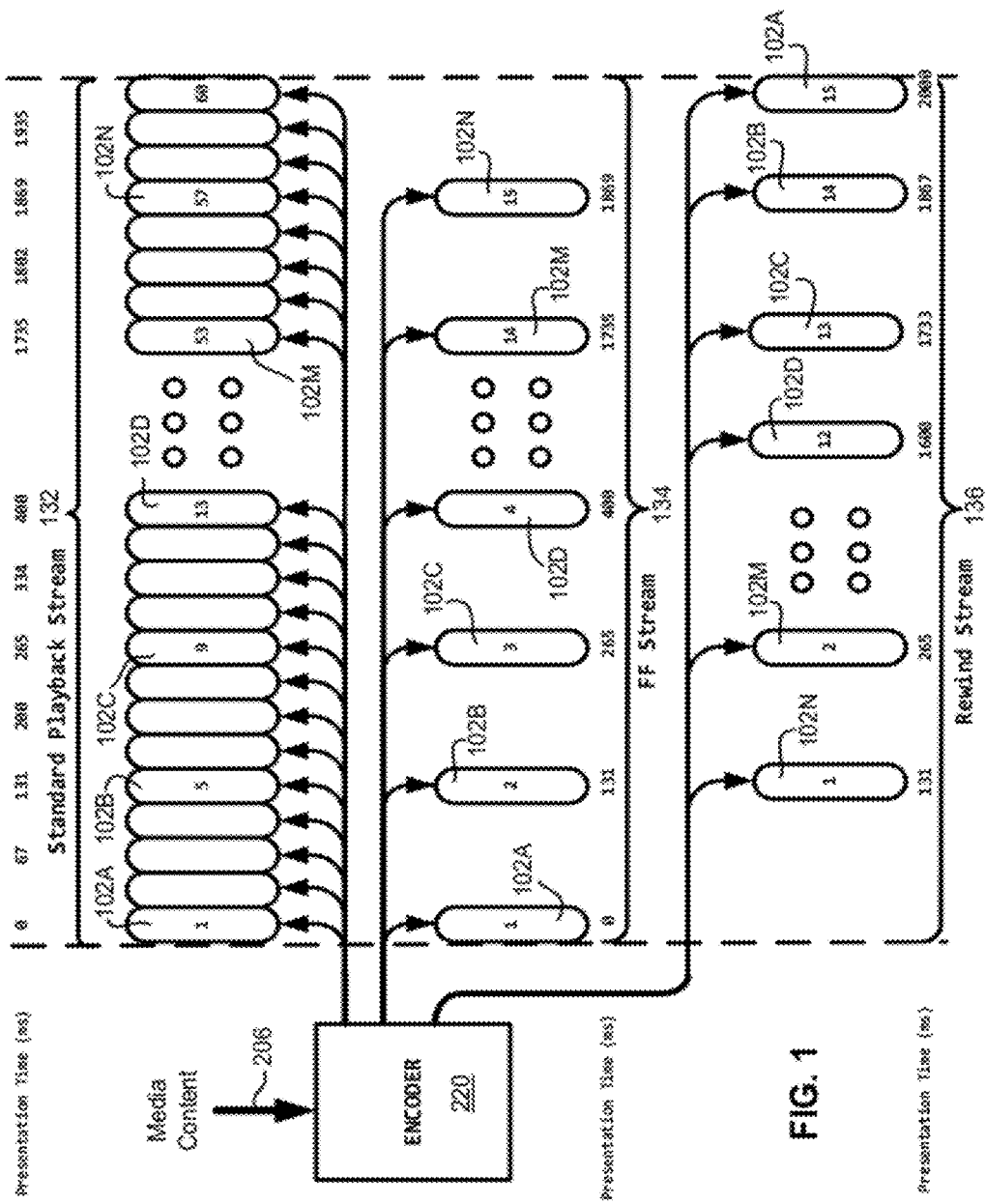
FIG. 1 illustrates one technique for generating a media stream suitable for trick play.

Turning now to the drawing figures and with initial reference to FIG. 1, an exemplary embodiment suitably represents a common portion of a media stream using two or more separate and differently encoded media content objects 132, 134, 136. Objects 132, 134, 136 may be encoded with different frame rates, for example, and/or with the various video frames encoded in reverse order to facilitate trick play operations. In the example of FIG. 1, the object 132 having a higher frame rate could be used to present the content during regular playback, whereas the objects having lower frame rate (e.g., objects 134 and 136 in this example) could be used to present the same content in a trick play mode in which fewer frames from the same portion of the media stream are presented to the viewer, but at an accelerated playback rate. Further, the various content frames in one or more objects (e.g., object 136 in FIG. 1) may be encoded in reversed order in comparison to other objects 132, 134 to facilitate more effective "rewind" operations when playback proceeds backwards in time. Similar concepts could be equivalently applied to present a forward and/or reverse "slow motion" stream using objects encoded with a higher frame rate, thereby allowing for greater frame resolution than would be otherwise available. Any number of media content objects 132, 134, 136 may be encoded at any number of different frame rates to support any number of faster, slower or equal playback speeds in either a forward or reverse direction, as desired.

In the example illustrated in FIG. 1, object 132 contains approximately sixty video frames 102 that provide about two seconds of video content (e.g., a frame rate of about 30 frames/second; the exemplary presentation times shown in FIG. 1 are based upon a 29.97 frame/second playback rate, although other rates could be equivalently used). Objects 134 and 136 are shown representing the same two seconds of media content as object 132 with about fifteen video frames 102, so the frame rate of objects 134 and 136 in this example is about one fourth that of object 132 (e.g., about 7.5 frames/second). Object 136 also shows the various frames 102 ordered in reverse sequence in comparison with objects 132 and 134 so that the frames occurring later in time during regular playback are decoded and presented first, thereby facilitating an a more efficient rewind function. Other embodiments could encode objects 132, 134 and 136 (as well as any number of additional objects representing the same portion of the media stream) to have different durations, frame rates and/or other parameters. It is not necessary that the forward and reverse streams have the same frame rates, nor is it necessary that the same number of forward and reverse streams be provided. Any number of additional or alternate streams having any number of different frame rates proceeding in either forward or reverse direction could be provided in any number of equivalent embodiments.

By selecting between the streams that include objects 132, 134 and 136, then, the frame rate of the media stream can be adapted to compensate for user changes in the playback speed. If the user wishes to advance (or rewind) the media stream at a faster than normal rate, conventional techniques would simply decode the full stream, but then present only a subset of the frames to so that the programming appears to move at a faster rate. Using FIG. 1 as an example, all sixty of the frames in object 132 could be presented within the two second time frame during normal playback. If the viewer wanted to "fast forward" through the content represented by object 132, one way to accomplish this would be to simply present the frames 102 (or a subset of the frames, such as the key frames) contained within object 132 within a shorter time period. If all the frames of object 132 were presented within a half second, for example, the program would appear to progress at a "4×" playback rate, with a frame rate that was similarly multiplied by a factor of four (i.e., 120 frames/second in this example). Receiving, decoding and rendering all of this data within this time frame, however, would typically require a relatively large amount of network bandwidth, as well as relatively powerful data processing resources on the client device.

Only a subset of the frames in object 132 would need to be presented during the accelerated playback (e.g., fast forward or rewind) to preserve the same effective frame rate experienced during regular playback. That is, the same effective frame rate experienced during regular playback could be preserved during 4× playback using only 25% of the frames contained within object 132. In most conventional implementations, however, the player still needs to identify the key frames that would be presented during accelerated playback, so it still needs to obtain the full content of the object in order to find and process the few frames that will be actually rendered. The extra frames in object 132 are ultimately discarded, but only after they have been transported and processed by the media player. Moreover, since the key frames are not necessarily spaced at regular intervals, key-frame-only playback can appear uneven and inconsistent to the viewer.

A more efficient approach would be to use a different object 134 or 136 that provides the same portion of the stream as object 132, but at a different frame rate that is more suitable for the current playback rate. If the user commands a "4×" playback speed in the forward direction, for example, object 132 could be replaced with object 134, which contains all of the needed frames to support the faster playback without degradation in frame rate. Object 134, despite having fewer frames than object 132, would nevertheless be able to provide an equivalent frame rate as object 132 during faster playback. Moreover, because object 134 contains fewer frames 102 than object 132, object 134 will typically require less network bandwidth for transportation and fewer processor resources for decoding. The particular parameters and values used in this example could be modified in any number of other embodiments; the frame rate could be increased or decreased as appropriate to provide a desired effective frame resolution for any number of different playback speeds, and/or any number of additional objects may be encoded to represent the same portion of the media stream at any number of different frame rates.

Similar concepts could be used to provide reverse-direction playback, as in a "rewind" function. In the example shown in FIG. 1, object 136 differs from objects 132 and 134 in that the various physical frames 102A-N are encoded in reverse temporal order. That is, frames that represent content appearing later in time during normal playback (e.g., frame 102N) are provided within object 136 before frames that would appear earlier in time during normal playback (e.g., frame 102A). By providing "later" frames earlier in the object 136, the frames that are displayed first during reverse playback are the first frames received by the decoder. The first frame received in object 136 (e.g., frame 102N in FIG. 1), for example, is the first frame presented during reverse playback. Since the decoder receives the frames 102A-N in essentially the same order that they will be rendered during reverse playback, the need to decode and cache additional frames 102A-N prior to rendering the reverse stream to the viewer is substantially reduced, if not eliminated. Further, the playback will be much smoother, since frames are provided at regular intervals, in comparison to techniques that render only key frames.

Different encoding of frame rate and/or frame direction may be combined as desired. In the example of FIG. 1, object 136 is shown to be encoded at a similar reduced frame rate as object 134 to facilitate faster playback speeds, albeit in an opposite direction as object 134. Other embodiments, however, may encode one or more reverse streams at a higher or lower frame rates to provide effective reverse playback at different speeds. An additional stream could be encoded at the same frame rate as object 132, for example, but in reverse frame order to facilitate effective reverse playback at the same speed as normal forward playback. Additional streams of higher or lower frame resolution reverse playback may be provided in any number of other embodiments.

In various embodiments, each media content object 132, 134, 136 is a streamlet, file or similar data object that represents a particular portion of the overall stream made available to the user. In such embodiments, each data object may be created to represent a particular portion of the original media stream that has a predetermined length of time, such as the two-second duration shown in FIG. 1. In other embodiments, the predetermined length of time may be in the range of between about approximately 0.1 and 8.0 seconds, for example, although other predetermined lengths may be equivalently used. Further, the media content in the object may have a unique time index in relation to the beginning of the media content contained in a stream. The various objects may be equivalently organized in a spatial manner (e.g., arranged and indexed according to a file size) or in any other manner.

Other embodiments may provide media objects that are not necessarily "chunked" or otherwise distributed as separate files, but that instead provide relatively continuous streams of media content in conjunction with a table or other metadata that identifies the locations of "key frames" or the like that are used in trick play. In such embodiments, the metadata would typically provide a common time or other index that allows for changing between continuous streams while preserving the continuity of the viewer experience. The various "objects" or "portions" of the media stream could therefore be identified through processing of the metadata even if separate files or streamlets were not available.

In various embodiments, multiple sets of media objects are appropriately generated using common space or time indexes so that the objects from different sets can be sequentially intermixed as the user commands different playback rates or directions of playback. That is, an object from a first set of objects may be followed by an object from a different set that has different encoding parameters, but that nevertheless provides the appropriate portion of the media stream in the manner expected by the viewer for the trick play operation. Switching between sets of discrete objects allows for responsive adaptation to network conditions, user instructions and/or the like while preserving visual continuity of the programming stream expected by the viewer. In the example presented in FIG. 1, replacing object 132 with object 134 or object 136 preserves visual continuity to the viewer, since objects 132 and 134 in this example are time indexed according to a common presentation time index, thereby ensuring that the content represented in objects 132, 134 and 136 represents the same portion of the overall media content, albeit at a different frame rate and/or direction.

Figure 2:
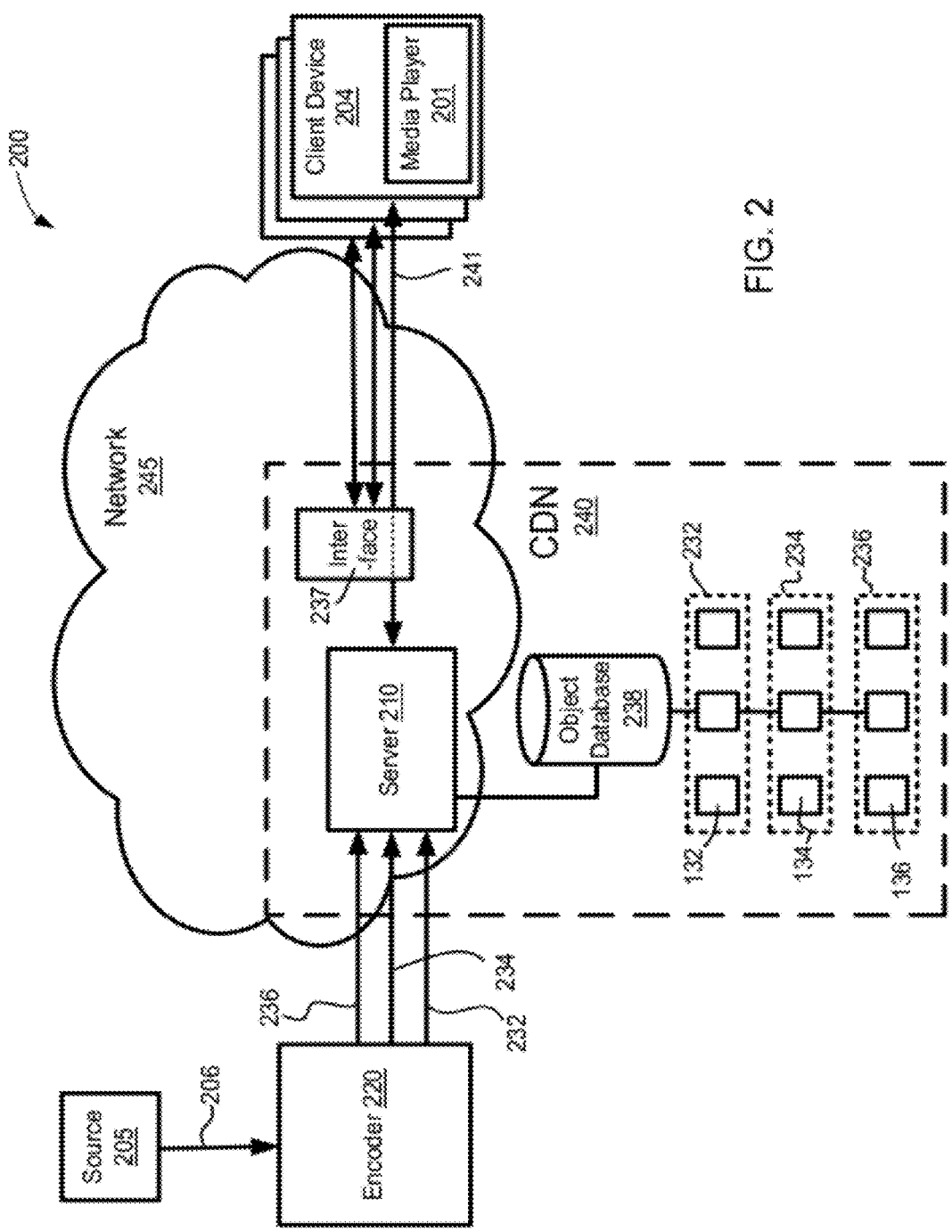
FIG. 2 is a schematic block diagram illustrating one embodiment of a computing environment in which trick play of a media stream may be performed.

With reference now to FIG. 2, an exemplary computing environment 200 to make a media stream available to one or more client devices 204 via a network 245 suitably includes a communications interface 237, a database 238 that stores two or more sets 232-236 of media objects, and a media server 210 that sequentially provides the various particular objects from various sets 232-236 to client devices 204 via network 245, as desired. The computing environment 200 may also include a media content source 205 and an encoder 220, as desired, although other embodiments may perform the encoding function entirely separately from the content delivery function.

The content server 210 and client devices 204 are able to communicate using one or more data communications networks 245 such as the Internet and/or one or more common local area networks (LAN), personal area networks (PAN), campus area networks (CAN), metropolitan area networks (MAN), wide area networks (WAN), wireless local area networks, cellular networks, virtual local area networks, any combination of the foregoing, and/or the like. Other embodiments may allow communications between content server 210 and client devices 204 in any other manner.

Client devices 204 are any suitable devices configurable to receive audio, video and/or other media content from the media server 210 over one or more streaming connections 241. Examples of client devices 204 could include (without limitation) client workstations, servers, personal computers, portable electronic devices, mobile telephones, personal digital assistants, video game systems, entertainment systems, set-top boxes, digital receivers, digital televisions, time or place shifting devices, and/or other electronic devices as desired. In some implementations, client device 204 may be implemented using a general purpose computing system that executes software or firmware to provide a media player application 201, as appropriate. The media player 201 may be a piece of software that plays the media content (e.g., displays video and plays audio), such as any sort of standalone software application, web browser plug-in, combination of browser plug-in and supporting web page logic, or the like.

FIG. 2 shows a content source 205 that provides a media stream 206 to an encoder 220, as appropriate. In the embodiment depicted in FIG. 2, the media source 205 may be a publisher server, a publisher content repository, a creator or distributor of media content, and/or any other source of audio, video or multimedia content as desired. For example, if the media content 206 to be streamed is a broadcast of a television program, the source 205 may be a server affiliated with a television or cable network channel such as the ABC® channel, or the MTV® channel. The publisher may transfer the media content 206 over the Internet or another network to the encoder 220, which is appropriately configured to receive and process the media content 206 to create any number of encoded streams 232, 234.

Each encoded stream 232, 234, 236 suitably represents a set of media objects (e.g., objects 132, 134, 136) each having different frame encoding parameters (e.g., frame rate, frame direction and/or the like). Each of these streams 232-236 may be stored in database as a set of streamlets or similar objects that collectively represent a copy of the original media content 206. Generally speaking, each of the different sets 232-236 of objects will share a common time or other index so that objects from different sets 232-234 may be intermixed with each other when the objects are made available to client devices 204, thereby allowing the content stream to adapt to network conditions, user inputs and any other factors as appropriate.

The various objects may be stored as one or more files or sets of separate files on any one or more of content servers, web servers, database servers, cache servers, proxy caches, or other devices on the network, such as found in a conventional content delivery network (CDN) 240. In various embodiments, the objects are stored within database 238, as desired, for subsequent retrieval by media server 210 so that the objects can be made available to client devices 204.

Interface 237 is any sort of interface card, server and/or other computing hardware that is capable of facilitating communications between media server 210 and one or more client devices 204. In various embodiments, media server 210 may be implemented with a conventional computer server (including any conventional computing hardware, any sort of virtual "cloud-based" server, and/or the like), with interface 237 facilitating network communications between media server 210 and one or more client devices 204. Other embodiments may allow client devices 104 to retrieve media objects from more than one media server 210 within CDN 240, as desired. Interface 237, then, may be a simple interface card useable by a particular server, or, equivalently, an interface server that may provide load balancing, routing, authorization and/or authentication, firewall services, and/or other features as desired.

Although one connection 241 to media server 210 and/or CDN 240 has been illustrated in FIG. 2 for each client device 204, each connection 241 may logically represent multiple network connections to the CDN 240. In one embodiment, each client device 204 is able to establish multiple Transport Control Protocol (TCP) or other connection 241 to the CDN 240 via network 245. In another embodiment, the media content is stored in multiple CDNs. Content may be stored, for example, in the origin servers associated with each of the multiple CDN. The CDN 240 may be used for the purpose of improving performance, scalability, and cost efficiency to the end users (e.g., viewers) by reducing bandwidth costs and increasing global availability of content. In other embodiments, other techniques may be used to make the media content available to the media players from the origin servers, such as peer-to-peer networks, or the like. Also, although media server 210 has been illustrated as being within the CDN 240 in FIG. 2, the server 210 may equivalently reside outside of the CDN 240 and still be associated with the CDN 240.

As described above, each trick play stream 234, 236 represents a copy of the original media stream at a different frame rate and/or direction than the regular playback stream 232, as described above. Each of these representations is stored at media server 210, database 238 and/or another part of CDN 240, as appropriate. The various streams 232-246 may be stored as separate files or other objects that are independently requestable, deliverable and/or playable by the client device 204. Each of the encoded objects may be stored in one or more content servers 210, on the web servers, proxy caches, edge caches of the CDN 240, and may be separately requested and made available to the client device 204.

The various concepts described herein may be implemented using client-driven, server-driven, and/or any combination of client and/or server-driven streaming implementations. In various embodiments, the server 210 typically selects which content objects to send to the client device 204 based upon user inputs and/or other information provided by the client device 204. In other embodiments, the client device 204 determines which particular content objects to request from the content server 210. Client devices 204 may, for example, request separate objects from media server 210 using conventional protocols such as the hypertext transport protocol (HTTP) or the like. One type of request that could be used in "pull" scenarios is a HTTP "GET" or similar request, although other embodiments may use any number of other mechanisms to request streamlets or other objects from server 210.

Various embodiments are therefore able to make the media stream available using a sequence of objects 132, 134, 136. Objects are selected by either the client 204 or the server 210, and the selected objects are sequentially provided from server 210 to client 204 via network 245. In many embodiments wherein the client device 204 initiates requests for objects, a conventional web-type file server can be used to retrieve and serve the requested objects, thereby reducing the need for specialized servers to support specialized media streams while preserving the ability to perform trick play functions as the stream is being provided.

Other embodiments may use different techniques for providing media content over network 245. Some embodiments, for example, may store the content in a single file that is divided into portions that can be cached in CDN 240 and/or requested using HTTP range requests or the like. Other embodiments may provide an adaptable content stream using RTSP or other protocols, as desired. In some implementations, RTSP or other protocols may be encapsulated within or otherwise transmitted via TCP, UDP, RTP, HTTP and/other transport protocols to facilitate delivery through firewalls, or for any other purposes. Again, the use of standard protocols such as HTTP or the like often reduces or eliminates the need for network administrators to configure firewalls to recognize and pass-through network traffic for specialized protocols. Any number of equivalent variations could be formulated.

Any number of additional trick play streams 234, 236 can be created by encoder 220 in a similar manner as the pull-based configuration described above. The additional encoded content file(s) can be stored as appropriate, such as in data base 238. Objects may be selected at player 201 or another portion of client device 204, by logic executing within server 210, or in any other location as desired. The selected objects may then be provided in any manner from server 210 to the client device 204 for playback. The various trick play concepts described herein could therefore be applicable to either push or pull concepts, or other network delivery techniques that are based upon client-side, server-side, or any combination of client and server-side logic.

Many embodiments may be further enhanced with adaptive streaming capabilities to adjust the quality of the regular or trick play stream in response to network conditions, player capabilities or other factors as desired. To implement adaptive streaming, the encoder 220 additionally encodes the normal playback stream 232 and/or one or more of the trick play streams 234, 236 at several different quality profiles. The quality profiles each represent different parameters such as how the stream is to be encoded, the width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like.

Various client devices 204 may process different quality levels of the same media content 206, depending upon the application, preferences of the viewer, device capabilities, network throughput, or any other factors. Some implementations may make different quality profiles available to the client device 204, as desired. In such embodiments, different media players 201 may receive the same portion (e.g., same time index) of the media content, but at different quality levels. For example, one media player 201 may request a streamlet having HD quality video, since the computing device of the requesting media player has sufficient computational power and sufficient network bandwidth, while another media player 201 may request objects having lower quality, since its computing device may not have sufficient network bandwidth, for example. In one embodiment, the media player 201 shifts between quality levels at the portion boundaries by requesting portions from different copies (e.g., different quality streams) of the media content, as described in U.S. Patent Application Publication No. 2005/0262257, filed Apr. 28, 2005. Alternatively, the media player 201 requests the portions using other techniques that would be appreciated by those of ordinary skill in the art having the benefit of this disclosure. The various quality parameters used in encoding may be combined as desired, and used to supplement the various types of frame encoding described herein. For example, at least one stream 242 may be encoded that has a relatively low frame rate to support trick play but that has a relatively high bit rate to maintain image quality even during trick play operations. Any number of different streams having any variety of parameters may be encoded and otherwise processed in various embodiments.

To implement trick play features, then, media objects having an appropriate frame rate and/or frame direction to support the desired playback are provided from the server 210 to the media player 201 or another component of client device 204. The particular streamlets or other objects may be selected and requested by the media player 201 (e.g., using an HTTP "GET" instruction) in some implementations, while other implementations may respond to user inputs or other appropriate information to provide objects that are selected at server 210, at database 238, and/or elsewhere in environment 200 to client device 204 as desired.

In various embodiments, the playback of the various streams can be varied and controlled to support trick play at any playback speed, such as at 3×, 0.5×, 10×, 7.5, or any other multiple. The media player 201 suitably renders the frames at the appropriate intervals to achieve the desired playback rate. Because the playback rate is variable, the player can compute and change the rate to be accelerating or decelerating in a continuous manner in many implementations. In other embodiments, the encoder encodes two or more special streams at different lower frame rates (e.g., four frames/second and eight frames/second). The media player 201 (or server 210, as appropriate) may compute which stream to use to generate the smoothest rendering of the desired rate multiple without increasing load on the CPU or decoding hardware. Further, frames may be encoded in forward or reverse order, as described herein, to support reverse playback as desired.

Figure 3:
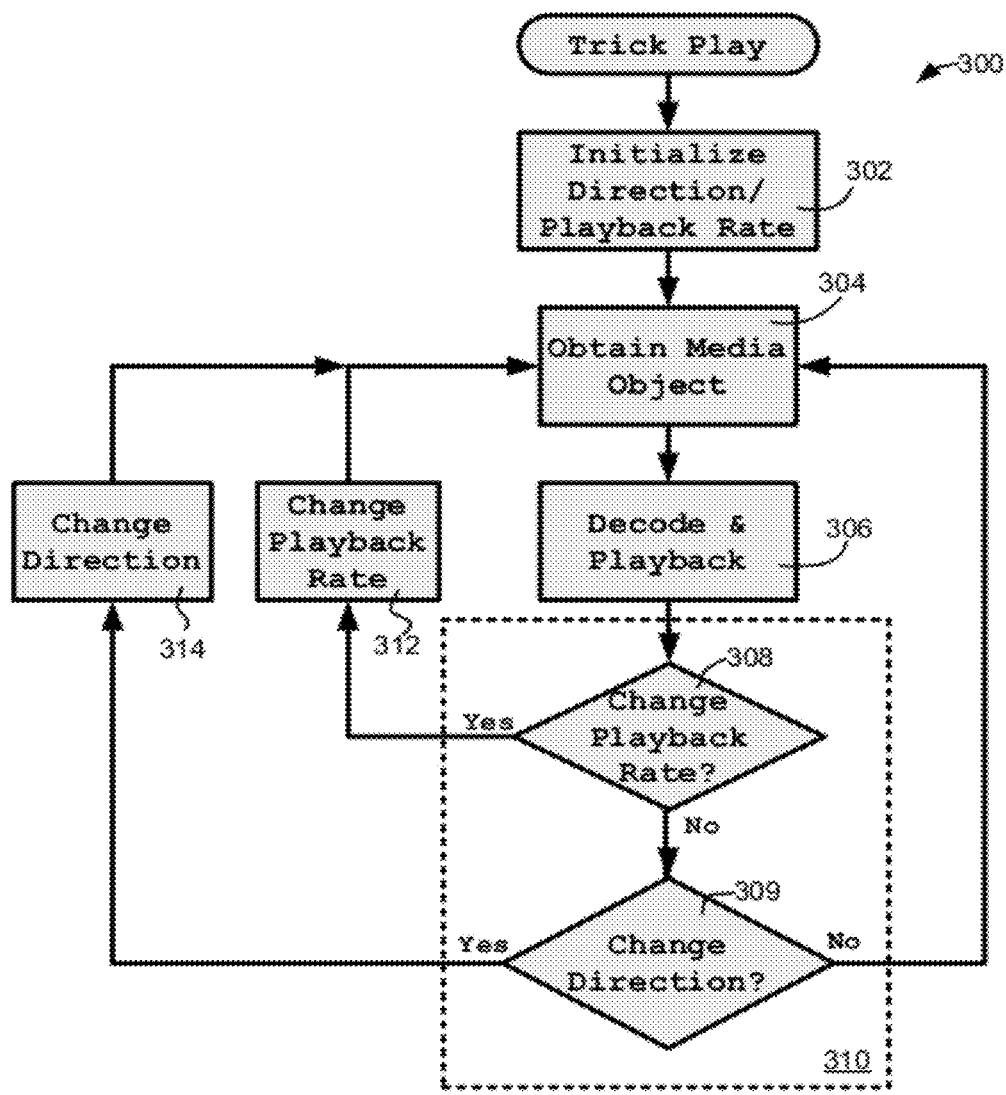
FIG. 3 is a flowchart of an exemplary process for processing trick play operations.

FIG. 3 is a flowchart of an exemplary process 300 that could be used in some embodiments to implement trick play features such as fast forward, rewind and/or slow motion playback (in either forward or reverse direction) of a media stream. The various functions shown in FIG. 3 may be implemented in software or firmware that can be store in any non-transitory medium (e.g., memory or mass storage within client device 204) and that can be executed by any sort of microprocessor, microcontroller, digital signal processor or other programmable logic. Various implementations may implement most, if not all, of process 300 within client device 104, whereas other implementations may implement several of the functions (e.g., functions relating to selection of a particular object or object stream) with in media server 210 or another portion of CDN 240. The particular means used to implement the various functions shown in FIG. 3 may therefore vary from embodiment to embodiment.

Process 300 suitably includes the broad functions of initializing a playback rate and direction of playback (function 302), obtaining a media object that corresponds to the playback rate and direction (function 304), decoding and playing back the obtained media object (function 306), and responding to a user input 310 directing a trick play feature to adjust the playback rate (functions 308, 312) or playback direction (functions 309, 314) as desired. The basic functions shown in FIG. 3 may be modified, supplemented or differently organized in any logical, temporal or other manner, as desired.

As noted above, trick play features may be implemented and/or enhanced through the use of streamlets or other media objects 132, 134 that have different characteristics suitable for the particular playback parameters desired by the viewer or other user. Note that streamlets or similar objects 132, 134, 136 from various streams or sets 232, 234, 236 may be sequentially obtained and intermixed with each other based upon a temporal or spatial index. Objects may be sequentially obtained in a forward or reverse direction to support playback at any speed and in either direction, thereby allowing for a very high level of user control.

Playback may be initially performed at any rate, and in a forward or reverse direction (function 302). In some embodiments, playback may initialize with a "freeze frame" or still image, as desired. Function 302 suitably involves setting initial parameters for obtaining appropriate media objects 132, 134 as desired.

Media objects 132, 134 may be obtained in any manner (function 304). In various embodiments, client device 104 suitably obtains an appropriate streamlet or other media object from server 210 as appropriate. Such requests may be made using, for example, HTTP or similar protocols to obtain file-type objects from a conventional CDN or other web-type server accessible over the Internet or another network. Equivalently, objects may be provided to the client device 204 using RTSP or other streaming protocols. In various embodiments, streamlets or similar objects 132, 134, 136 may be identified by client device 204 and/or media server 210 using any sort of naming or file identification format. Objects 132, 134, 136 may be located by name or uniform resource locator (URL) within database 238, for example. In some embodiments, the name of each object 132, 134, 136 is determined at least in part from the relative time or spatial index value corresponding to the object, and/or from the stream or set 232-236 that includes the particular object 132, 134, 136. Other embodiments may identify objects through a data table or other structure, through metadata that identifies relative locations in one or more continuous data streams, or in any other manner.

Still other embodiments may select and obtain the appropriate objects using server-based logic as described above, or the like. Particular media objects are selected by the client 204 and/or by the server 210 in any manner. The selected objects are then provided from server 210 to client 204 using any sort of file based (e.g., delivery of streamlets or other files in response to HTTP GET requests), stream based (e.g., RTSP), and/or other delivery techniques.

The received media objects are decoded and rendered for playback as desired (function 306). Playback is typically performed by media player 201 or the like executing on client device 204 and using conventional techniques in accordance with the then-current parameters governing the speed and/or direction of playback. Rendering the media content for playback could involve, in various embodiments, presenting the decoded content on a display associated with the client device 204 itself (e.g., a display on a computer system, mobile phone or the like). Alternately, rendering the content for playback may involve providing signals representing the content to a television or other external display (e.g., a television receiver or set top box could render content by providing appropriate output signals to a television or other display). Other ways of "rendering" content for playback may consider placeshifting or other remote display concepts, as desired.

If the user provides an input 310 to change the playback of the media stream, then streamlets or other media objects 132, 134, 136 having different parameters may be obtained during subsequent object requests or pushes, and/or playback parameters may be adjusted to accommodate the available object sets as desired.

If the viewer wishes to change the playback rate (function 308), for example, then media objects 132, 134 encoded at a more appropriate frame rate for the new playback speed (function 312) may be obtained during subsequent object requests. As playback speed is increased, it may be desirable to obtain a streamlet or other media object 134, 136 that has a lower frame rate for an equivalent period of time. Conversely, if playback speed is decreased (e.g., to support a slow motion feature), then objects with the same number or additional frames may be desirable to maintain the effective frame rate through the slower playback speed. If a media object 132, 134, 136 having the optimal or particularly-requested frame rate is not available, then subsequent requests may simply choose an object with a frame rate that more closely approximates the desired rate, but that nevertheless provides sufficient data to maintain image consistency. If the viewer requests an 8× playback speed but only 1× and 4× streams are available, for example, then the 4× stream may be selected, with subsequent playback discarding the unused frames. Although this may not be as efficient as receiving a media object previously encoded at the requested rate, it will still conserve network bandwidth and processing resources in comparison to processing the 8× playback based solely upon the 1× media stream. Playback rates may be smoothly transitioned from one rate to another, or otherwise controlled by the user as desired.

If the user input additionally or alternately changes the desired direction of playback (function 309), then reverse-encoded streamlets or other media objects 136 can still be retrieved from the server 210 in sequence according to the time, space or other index; the direction of the sequence is simply reversed (function 314). Rewind functions, for example, could be processed by retrieving objects from reverse stream 236 in numerical sequence, but moving backwards in time (e.g., progressing toward time zero, or the beginning of the programming). In embodiments wherein the objects 136 are streamlets or similar discrete files requested from a server 210, the process for receiving prior objects is relatively convenient, since files can simply be requested in numerical or other indexed order. This conveniently allows for rewind functions that are not typically constrained to previously decoded and cached content, as was typical in many conventional streaming media implementations. In some situations, reverse playback for relatively short periods of time may be possible using only a single streamlet or other object, thereby reducing or eliminating the need to obtain multiple objects from the server 210.

Further, in embodiments where objects 136 having reverse-order encoded frames are available, the frames 102 are received in essentially the same order in which they are decoded and rendered. Rather than decoding and caching frames so that the last-received frame can be played first, then, the frames 102 in each object 136 are simply played in essentially the same order that they are received. This can substantially reduce memory consumption and processor loading, thereby greatly improving performance (or enabling rewind features on devices that would not otherwise have such capability).

The general process of obtaining media objects (function 304), rendering the obtained media objects for playback (function 306), and adjusting the playback in response to user inputs 310 can continue through any number of iterations as desired. In embodiments wherein common indexing is shared across separate streams having different encoding parameters, objects from any number of different streams can be intermixed in sequence to maintain image continuity to the viewer, as described above. This could allow for smooth acceleration or deceleration of forward or backward playback speed, for example, thereby providing a very pleasing user experience while preserving bandwidth and computing resources.

Further, because the received stream is provided in a manner that is selected based upon the desired playback mode (e.g., fast/slow, forward/reverse), the processing to decode and render the received stream is greatly simplified. The decoder simply decodes the various frames in essentially the order received, without substantial regard to the playback speed or direction, since the received media object 132, 134, 136 was encoded specifically to provide the playback mode commanded by the user.

The various techniques described herein may enable any number of convenient interfaces and other features for the viewer. Various embodiments could respond to inputs provided at an actual or virtual "jog dial", rotary control, slider-type and/or other input to smoothly adjust the playback speed in a manner that simulates varying the speed of a video tape machine or similar analog device. In such embodiments, continuously variable rate changes (or changes or at a selected multiple of the rate) can be done regardless of the initial playback rate that was in use before the trick play. A user might begin with the video playback paused, for example, and then proceed to search forward or backward to locate desired content. The user may then return to the zero-velocity state when the user finds what he or she wants.

Fast forward and slow motion effects can be similarly controlled by a dial in a hardware or software user interface. The farther the user turns the dial to forward or reverse, for example, the faster or slower the playback rate produced on the display. The playback rate may be appropriately varied in a continuous smooth manner. In some implementations, the speed could return to the initial steady-state playback rate (e.g., paused, regular playback, or the like). In one embodiment, a slider or rotary control could be implemented in a PC player interface to simulate spring loaded mechanical controls that are biased toward a zero-effect position when the user releases the control. Various embodiments therefore provide a very pleasing viewer experience that lets the user control playback at his or her own pace. These exemplary embodiments provide better usability and attractiveness of playback experiences in the streaming context, and provide playback experiences that are similar to the traditional TV playback experiences. Other embodiments may provide different features, including other types of user interfaces as appropriate.

In the preceding description, numerous details are set forth. It will be apparent, however, to one of ordinary skill in the art having the benefit of this disclosure, that many different embodiments may be practiced without these specific details. In some instances, well-known structures and devices are shown in block diagram form, rather than in detail, in order to avoid obscuring the more relevant details.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "receiving," "encoding," "generating," "splitting," "processing," "computing," "calculating," "determining," "displaying," or the like, may refer to the actions and processes of a computer system, or similar electronic data processing system, that manipulates and transforms data represented as physical (e.g., electronic) quantities within the computer system's registers and memories into other data similarly represented as physical quantities within the computer system memories or registers or other such information storage, transmission or display devices.

Various embodiments may also relate to an apparatus for performing the operations herein. This apparatus may be specially constructed for the required purposes, or it may comprise a general-purpose computer system specifically programmed by a computer program stored in the computer system. Such a computer program may be stored as software or firmware in source or object code form in any non-transitory computer-readable storage medium, such as, but not limited to, any type of disk including floppy disks, optical disks, CD-ROMs, and magnetic-optical disks, read-only memories (ROMs), random access memories (RAMs), flash memory, EPROMs, EEPROMs, magnetic or optical cards, or any type of media suitable for storing electronic instructions.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method executable by a client device to process a media stream of media content that is received via a network, the method comprising:
    requesting a first data file representing a first portion of the media stream at the client device via the network, wherein the first data file is encoded with a predetermined duration of the media content with a first number of video frames;
    rendering the video frames of the first data file at a first frame rate by the client device to thereby playback the first portion of the media stream represented by the first data file;
    receiving a user instruction at the client device to perform a trick play function that adapts the playback speed of the media stream;
    in response to the user instruction to adapt the playback speed of the media stream, requesting a second data file representing a second portion of the media stream via the network at the client device, wherein the second data file is encoded with the same predetermined duration of the media content as the first data file with a second number of video frames that is different than the first number of video frames used to encode the first data file; and performing the trick play function to adapt the playback speed of the media stream by rendering the frames of the second data file so that the predetermined duration of the media content represented by the second data file is rendered over a different period of time than the same predetermined duration of the media content represented by the first data file without degradation of the first frame rate.

2. The method of claim 1 wherein the number of frames contained in the first data file is greater than the number of frames contained in the second data file.

3. The method of claim 1 wherein the trick play function is a rewind function.

4. The method of claim 3 wherein the frames of the second data file are encoded in reverse order in comparison to the first data file.

5. The method of claim 3 wherein the second data file is encoded such that frames containing content occurring later in time during regular playback of the media stream are positioned for decoding prior to frames that occur later in time during regular playback.

6. The method of claim 3 wherein the first data file and the second data file are separate media files identified by a shared time index and wherein the separate media files representing the first and second portions of the media stream are requested according to the shared time index.

7. The method of claim 6 wherein the second data file is encoded such that the frames of the second data file are arranged in reverse order in comparison to the frames of the first data file.

8. The method of claim 6 wherein the second data file is encoded such that frames containing content occurring later in time during regular playback of the media stream are positioned for decoding before frames that occur sooner in time during regular playback.

9. The method of claim 1 wherein the trick play function is a fast forward function, and wherein the first data file is encoded with more video frames than the second data file.

10. The method of claim 9 wherein the first and second data files are separate media files identified by a shared time index, and wherein the shared time index of the second object follows the shared time index of the first data file to indicate a subsequent portion of the media content having the predetermined duration, and wherein the media file representing the first data file contains more video frames than the media file representing the second data file encoded at the lower frame rate even though both data files represent the same duration of the media stream.

11. The method of claim 1 wherein the first data file is received in response to a first HTTP GET request for the first data file, and wherein the second data file is received in response to a second HTTP GET request for the second data file.

12. The method of claim 11 wherein the first and second HTTP GET requests are placed to a file service on the network, and wherein the first and second data files are received from the file service in a file-based format.

13. The method of claim 12 wherein the file service is a content delivery network.

14. The method of claim 1 wherein the number of video frames in the first data file is approximately four times the number of video frames in the second data file.

15. The method of claim 14 further comprising:

receiving a third data file representing a third portion of the media stream via the network, wherein the third data file encodes the same predetermined duration of the encoded media content with a third number of video frames that is different than the first number and the second number; and rendering at least some of the third portion of the media stream encoded by the third data file for playback to thereby continue the trick play function instructed by the user.

16. The method of claim 15 wherein the rendering of the third portion provides the trick play function at a faster playback rate than the rendering of the second portion.

17. The method of claim 16 wherein the first number of video frames is greater than the second number of video frames, and wherein the second number of video frames is greater than the third number of video frames.

18. The method of claim 1 wherein a second number of video frames is greater than a first number of video frames, and wherein the trick play function instructed by the user is a slow motion function.

19. A method executable by a data processing system to provide a media stream that represents a media program to a client device via a network, the method comprising:

maintaining a first set of files that collectively represents the media stream, wherein each of the first set of files is sequentially ordered according to a time index so that each of the first set of files represents a predetermined duration of the media program that is encoded at a first frame rate;

simultaneously maintaining a second set of files that collectively represents the same media stream sequentially-ordered according to the same time index as the first set of files, wherein each of the second set of files represents the same predetermined duration of the media program that is encoded at a second frame rate that is different from the first frame rate so that the files of the second set represent the same portions of the media program as the files of the first set but with different numbers of video frames;

sequentially providing files from the first set of files to the client device via the network during normal playback of the media stream to thereby allow the client device to render the media stream at a playback frame rate; and sequentially providing files from the second set of files to the client device during a trick play operation in which the playback speed of the media stream is altered to thereby allow the client device to render the different number of video frames of the second set of at the same playback frame rate as the first set of files so that the predetermined duration of the media program represented by the second set of files is rendered over a different period of time to thereby adapt the playback speed of the media program without degradation in the frame rate.

20. The method of claim 19 wherein the second frame rate of the files provided during the trick play operation is less than the first frame rate of the files provided during normal playback of the media stream.

21. The method of claim 19 wherein the files from the first set of files are sequentially provided according to the time index in a first direction during the normal playback of the media stream, wherein the trick play operation is a rewind operation, and wherein the files provided from the second set of files are sequentially provided according to the time index in a second direction opposite the first direction during the rewind operation.

22. The method of claim 21 wherein the frames in each of the second set of files are encoded in reverse order in comparison to the first set of files.

23. The method of claim 21 wherein each of the second set of files is encoded such that frames containing content occurring later in time during normal playback of the media stream are positioned for decoding before frames that occur later in time during normal playback.

24. The method of claim 19 further comprising maintaining a third set of files that collectively represents the same media stream sequentially-ordered according to the same time index as the first and second sets of files, wherein each of the third set of files is encoded at a third frame rate that is different from either the first or the second frame rates so that the files of the third set represent the same portions of the media program as the files of the first and second sets encoded with different numbers of video frames, and wherein files are provided from the third set of files to the client device via the network to thereby accelerate a rate of the trick play operation.

25. The method of claim 19 wherein the files from the second set of files are provided in response to a user of the client device instructing the trick play operation.

26. A data processing system that provides a media stream of media content to a client device via a network, the data processing system comprising:
an interface to the network;
a database configured to simultaneously maintain a first set of files and a second set of files that each collectively represent the same media stream and that are each sequentially ordered according to a common time index, wherein each of the second set of files represents the same predetermined duration of the media content as the files of the first set of files, but wherein the second set of files is encoded at a different frame rate from the first set of files so that the second set of files represents the same predetermined duration of the media content with a different number of video frames from the first set of files; and
a file server in communication with the database and the interface, wherein the file server is configured to sequentially provide files from the first set of files to the client device via the network during normal playback of the media stream to thereby permit the client device to render video frames of the first set of files for playback at a playback frame rate, and, in response to a user of the client device instructing a trick play operation that adapts a playback speed of the media stream, to provide files from the second set of files having the different frame rate to the client device during the trick play operation to thereby permit the client device to perform the trick play operation by rendering the different number of video frames in the second set of files for playback at the same playback frame rate as the first set of files so that the predetermined duration of the media program represented by the second set of files is rendered over a different period of time to thereby adapt the playback speed of the first media program without degradation in the playback frame rate during the trick play operation.

27. The data processing system of claim 26 wherein the file server is configured to sequentially provide the files from the first set of files according to the common time index in a first direction during the normal playback of the media stream, wherein the trick play operation is a rewind operation, and wherein the files provided from the second set of files are sequentially provided according to the common time index in a second direction opposite the first direction during the rewind operation.

28. The data processing system of claim 26 wherein the frames in each of the second set of files are encoded in reverse order in comparison to the first set of files.

29. The data processing system of claim 26 wherein each of the second set of files is encoded such that frames containing content occurring later in time during normal playback of the media stream are positioned for decoding before frames that occur later in time during normal playback.

30. The data processing system of claim 26 wherein the first and second sets of files have different frame rates so that the number of frames contained in first set of files is different than the number of frames contained in the second set of files.

31. The data processing system of claim 26 wherein the database is further configured to simultaneously maintain a third set of files that is sequentially ordered according to the common time index and that collectively represents the same media stream as the first and second sets of files, wherein each file in the third set of files is encoded such that video frames containing content occurring later in time during normal playback of the media stream are positioned for decoding before frames that occur later in time during normal playback.

32. The data processing system of claim 31 wherein the media server is configured to provide the second set of files when the trick play operation is a fast forward operation and the third set of files when the trick play operation is a rewind operation.

33. The data processing system of claim 32 wherein the second and third sets of files are each encoded at a lower frame rate than the first set of files.

* * * * *